United States Patent

[11] 3,630,074

[72] Inventor William Herbert Hartman
Fair Oaks, Calif.
[21] Appl. No. 808,732
[22] Filed Mar. 20, 1969
[45] Patented Dec. 28, 1971
[73] Assignee Research Derivatives Incorporated
Sacramento, Calif.

[54] RATE CONTROL FOR TOOLS
10 Claims, 2 Drawing Figs.

[52] U.S. Cl. .................................................. 73/90, 73/94
[51] Int. Cl. ................................................. G01n 3/00
[50] Field of Search ................................... 72/6, 8, 28, 21, 443; 91/364, 366, 361, 347.5; 73/90, 12, 93, 91, 94, 95; 324/68, 61, 70; 317/5; 180/105; 74/114

[56] References Cited
UNITED STATES PATENTS

| 3,245,253 | 4/1966 | Gruber | 73/91 |
| 3,340,883 | 9/1967 | Peternel | 137/26 |
| 2,411,451 | 11/1946 | De Martini et al. | 73/90 |
| 2,415,492 | 2/1947 | Hines | 324/70 |
| 2,445,682 | 7/1948 | MacGeorge | 73/90 |
| 2,445,683 | 7/1948 | MacGeorge | 73/90 |
| 3,390,612 | 7/1968 | Wills | 91/364 |
| 3,304,768 | 2/1967 | Naumann et al. | 73/90 |
| 3,433,061 | 3/1969 | Burr | 73/90 |

FOREIGN PATENTS

| 897,513 | 5/1962 | Great Britain | 324/70 CG |
| 1,233,643 | 2/1967 | Germany | 324/165 |
| 486,163 | 11/1948 | Canada | 324/176 |

OTHER REFERENCES
Bossert et al., Low–Speed Tachometer Review of Scientific Instrument, Vol. 32 No. 6, June 1961

Primary Examiner—James J. Gill
Assistant Examiner—John Whalen
Attorney—Owen, Wickersham & Erickson ABSTRACT: The first time derivative of the output voltage of a measuring transducer in a machine, which is a measure of the velocity of some parameter affected by the machine, such as the machine displacement, is compared with a fixed voltage standard. For a given velocity, the derivative output is fixed and if equal to the fixed reference, exactly balances out in the differential voltage comparator. If a velocity error is present, the comparator produces an error signal which is then amplified in a servocontrol arrangement, to force the machine to minimize the error signal and maintain a uniform rate of travel.

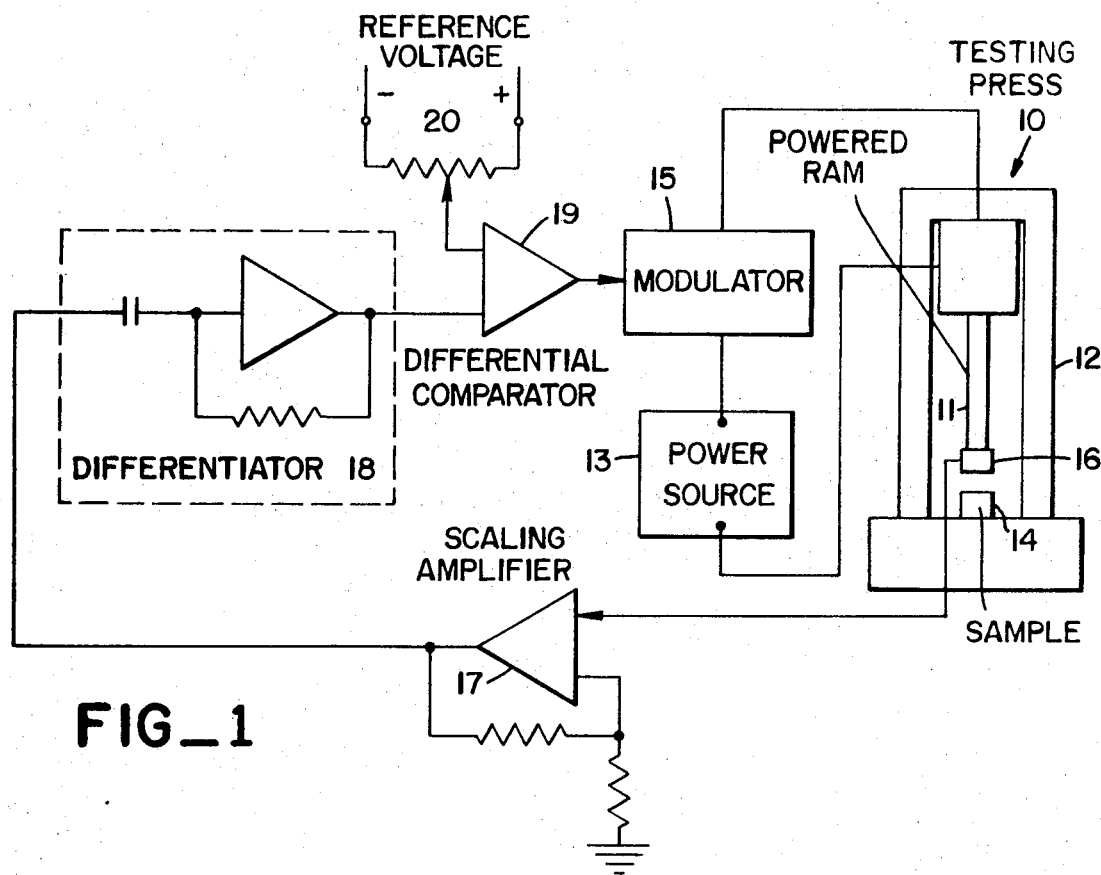
FIG_1
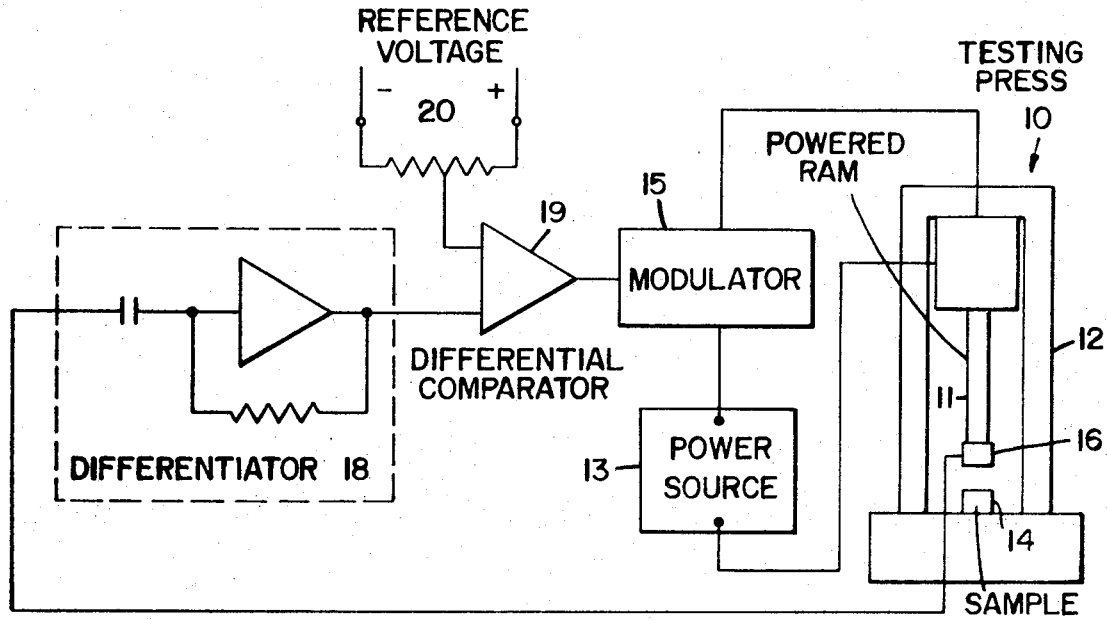
FIG_2
INVENTOR.
WILLIAM HERBERT HARTMAN
BY
Owen, Wickersham & Erickson
ATTORNEYS

RATE CONTROL FOR TOOLS

This invention relates to rate controls for controlling the motion of various linear machine-actuating devices for the positioning of tools in machine tool work and for operational processes in manufacturing. One specific application for this new rate control is in the field of testing presses.

The control is usually analog in nature, although it may well have digital elements within the system. The required control may be some nonlinear function of a linear variable, or a linear function of a nonlinear variable, so that a simple linear change in displacement may not suffice to provide the required action. Thus, the work *pressure* resulting from a linear change in *displacement* of the ram of a hydraulic press is ordinarily a highly nonlinear function. In order to achieve a linear increase of pressure over a given period of time, i.e., a constant rate of increase in pressure, the ram must move at a nonlinear rate of travel. Hence, a simple numerical machine tool positioning control would not provide the required linear change in pressure. In this example, displacement of the ram is the dependent variable of pressure, or in other terms, *strain* is the dependent variable of *stress*, and for a given stress rate, the strain is the parameter to be controlled.

The accuracy of control required in the environment of this invention may be appreciated by an example. Thus, in operation of a testing press having a capacity of 50,000 pounds, the total motion of the ram may be only about 0.005 inch from zero load to the full capacity of the machine, on certain hard samples. If the machine is to be accurately controlled to within 1 pound, then the mechanical travel of the ram must be predictably controlled to within one ten-millionth of an inch (0.0000001 inch), and the positional accuracy must be maintained while the temperature variations of the work and machine cause changes that are wide relative to this tolerance in order to assure the dimensional stability of the system.

As another example, the rate controller of this invention may be used to provide a *uniform rate of travel* for a tool or process control parameter, while the tool by other parameters encounters extreme variations in resistance to its motion over the range of required mechanical travel. Thus, the ram of a testing press may be caused to move at a fixed rate of travel, even though the ram may encounter no resistance until it touches the workpiece, and then may suddenly reach pressures that increase quickly to the limit of the machine capacity. In this instance, the pressure achieved is the dependent variable of displacement, or in other terms, stress becomes the dependent variable of strain, and for a desired constant strain rate, the displacement of the ram is the independently controlled parameter.

The rate of speed of rotational machinery, as opposed to linear motions of limited travel, is usually sampled by means of tachometer generators. If the machine travel is very slow, the generator must be geared up in order to increase the speed for sufficient output and to reduce commutation ripple. This poses a severe mechanical constraint on the system, if the machine is to also operate in a high-speed mode, such as a rapid traverse operation which is many times the rate of its slower operating modes, for then the gearing of the tachometer is subjected to extreme stresses which may set an undesirably low design limit to the maximum machine rate of travel, or require the elaboration of complex clutches to disengage the mechanism. Tachometer generators are not well suited for machine travel at extremely low rates, such as a few thousandths of an inch per minute, nor is it convenient when the total travel is limited in distance, rather than a continuing function. The linearity of tachometer generators is limited and imposes other design limitations on the system rate accuracies that may be obtained.

Linear travel may be converted to rotational motion for use with tachometer generators, but such conversion is a highly unsatisfactory method of controlling the rate of testing press ram travel because of the defects described above.

The conventional method of strain rate control uses a feedback control system which establishes a *fixed position* corresponding to the value set in with an external reference voltage, which the machine is forced to match in a comparison evaluation. Any difference between the system position, as measured by the output of a displacement transducer, and that of the external reference potential, appears as an error in the feedback system, and the system provides a corrective action proportional to the error signal, the corrective action tending to cancel the observed positional error. Thus, the controlled parameter is positioned to a fixed location to effect a match against comparison with the reference potential, to within a vanishingly minute difference from that of the desired position.

In order to obtain a uniform strain *rate* (rate of change from one position to another), the reference in such a prior art system must be programmed to change at a uniform rate during the time interval. This requires that an externally generated reference be created in the form of a precision voltage ramp excursion, having a linear form of sufficient accuracy so as to permit the feedback positioning system to follow with the desired linearity of rate of displacement. Herein lies the crux of the problem.

This ramp comparison approach suffers from several severe defects. Total system rate accuracy becomes dependent upon the degree of linearity of the external ramp reference, as well as any inherent inaccuracy of the positional controller. Another severe limitation is the difficulty of providing a ramp function which can be started and stopped at will, or reversed at any point in time during its excursion, or can be adapted to be momentarily changed to another rate (slope of the ramp function waveform), or otherwise interrupted, without having to make a fresh start all over again from the initial beginning point. A typical system used for generating the required ramp function is a motor-driven potentiometer, and the inflexibility of such an arrangement is apparent.

Attempts have also been made to use a geared tachometer generator, such as described earlier, in a ramp generator. The voltage output of such a generator is a measure of the system's rate of displacement, and it was used in a comparison circuit in a conventional feedback servocontrol loop. The mechanical limitations in range of speeds due to stress limits of gear trains, high inertias, departure from linearity at high speeds, and low-speed limits due to ripple content of the generator output, which causes havoc in the control system,—these limitations posed undesirable design and operation constraints. Failure of the generator to accurately follow the true rate, due to these defects, gave rise to inaccurate performance of the system. Filtering, to reduce the ripple, would add greatly to the system lag and would make the system performance sluggish at best, and oscillatory and unstable at worst.

The conventional method used for obtaining a uniform stress rate (rate of pressure change) is similar to that described for the strain rate mode.

A measure of the pressure obtained from a strain gage transducer or Bourdon tube potentiometric pressure transducer was compared with a standard reference voltage obtained from an externally generated ramp function. The system operated to change the machine position to minimize the error in following the ramp excursion. Although capable of obtaining programmed rates of control, the scheme was inflexible with respect to the capability of interruption or change of rate at any time after the start of its excursion; it also possessed the difficulty of obtaining setting in an essentially zero rate for making initial contact with the work sample, as is desired for example in the operation of a press; further, it lacked ready capability to time the beginning of the ramp to coincide with an arbitrary initial pressure. This prior art technique also suffered from the inherent limitations imposed by the nonlinearity of the ramp function in addition to whatever inherent nonlinearity existed in the machine-positioning servo and the pressure transducer.

A tachometer generator system cannot be utilized in the stress rate mode, because the relation of pressure to ram displacement does not follow a uniform relationship, as explained above. The ram travel might be as much as an appreciable part of an inch for pressures of only a few thousand pounds, in the case of a workpiece consisting of soft material, whereas it might well reach a machine upper capacity of hundreds of thousands of pounds in only a few thousandths of an inch of ram travel, in the case of a hard workpiece of relatively large area. The only information available of value for control of the machine, in such a variety of conditions, is the signal output of the pressure transducer, not that of the rate of displacement of the ram. Thus, the operation of the machine must be dependent upon comparison of the machine pressure against some reference, and this reference is ordinarily externally generated in some programmed fashion to have the desired parameter change with respect to time as the desired rate curve of the machine to be controlled.

My new rate control system provides repeatable, predictable, and accurate control of the rates of travel for the ram of testing presses and other such machines and processes. The control can be used to adjust the rate of ram displacement (speed of travel) so as to achieve a *linear strain* rate for the specimen being tested; it can also be used in applications where it is desired to obtain a linear change in *stress* (stress rate), through control of the ram. Each of the modes utilizes a high degree of control of the ram travel displacement with respect to time.

Some significant advantages of my new method are that (1) greater linearity is gained, (2) operational control is made easier, (3) the ram is free from positional constraints, thereby enabling control to be maintained for any position of the ram, (4) there is excellent repeatability of rates obtained for a given setting of the rate control, and (5) the ramp function of strain or stress is self-generating with respect to time. As a result, my new system has greater operational utility and convenience and avoids all of the other complex problems and limitations that were inherent in conventional rate controls.

My rate controller utilizes the controlled machine as its own linear ramp-function generator, requiring a fixed voltage reference for a given rate, but requiring no externally generated linearly changing ramp voltage for comparison. The machine control of my new system is free from all of the defects and drawbacks of tachometer generator systems.

A very important, but perhaps subtle, distinction between my system and the conventional methods previously used is in the reference voltages for the two systems, the voltages used to set the desired rate. In the older method, the reference voltage must of necessity be changing and is supposed to have a slope identical to the desired change of controlled function with respect to time.

In my new system, the reference voltage is fixed, and its *static value* is used to set the desired rate. The inherent increase in accuracy which is obtainable from a fixed reference voltage contrasts with the inaccuracies which must be accepted in the generation of variable waveform reference standards. A fixed voltage reference, being a static value, may be compared with other precision standards for calibration and may be accurately repeated with laboratory precision, whereas variable function waveforms, not being invarient in time, are fleeting, transient phenomena which can only be analyzed after their occurrences.

In the new system, the overall closed loop feedback control system is a true rate control, having all of the variable parameters within the closed loop, so that the errors can be self-corrected. The older system, using the ramp comparison technique, was not a true rate control, but was a position control which used an external variable to program the position; not all of the variables were contained within the closed loop servosystem, therefore errors which occurred that were due to nonlinearities of the external variable were not corrected, due to feedback action of the servo; therefore, such systems were inherently less capable of precise control of rate.

Other objects and advantages of my invention will appear from the following description of some preferred embodiments.

In the drawings:

FIG. 1 is a block circuit diagram of a stress rate control system embodying the principles of the invention for controlling and testing press.

FIG. 2 is a similar diagram of a strain rate control system.

In the strain rate mode, my rate control method provides a technique based on the principle that velocity is the time derivative of displacement. This method obtains the first time derivative of the output voltage of a displacement measuring transducer such as a linear potentiometer, or a magnetic-reluctance type of transducer. This output voltage may be accurately differentiated by an operational amplifier feedback type of differentiator. Through the use of high open loop gain, the circuit provides a derivative signal of high accuracy when the loop is closed to unity gain condition. The differentiated voltage, which is a measure of the velocity of the machine displacement, is then compared with a fixed voltage standard. For a given velocity, the derivative output is also a fixed value, which if equal to the fixed reference, exactly balances out in the differential voltage comparator. If a velocity error is present, the derivative output fails to match the fixed reference, and the comparator has an error signal, which is then amplified in a servocontrol arrangement, and the machine is forced to minimize the error signal and to maintain a uniform rate of travel.

The deviation from true linearity of the rate is subject only to such deviation as is permitted by the feedback control loop, this amount being lessened and accuracy improved with increasing loop gain, and to any nonlinearity in transducer characteristics.

The output of the differentiator for a given rate is $di/dt$, where $i$ is the current flow through the differentiating capacitor produced by the change in voltage of the transducer. The voltage (or current) scale is set by the choice of the size of the capacitor and the associated feedback load resistor in the differentiating circuit. Values are chosen commensurate with the expected range of rates of travel to provide the needed sensitivity at low rates. The differentiator employed may be one of several types utilizing capacitors or inductors, with or without the employment of feedback amplification.

A reference voltage serves to establish the machine speed. The rate is a linear function of voltage; hence, the calibration of the rate control dial can easily be made to coincide with linear scale potentiometer controls or voltage sources. The direction of travel is determined by the choice of the reference voltage polarity. The calibration accuracy is limited essentially only by the linearity of the calibrating potentiometer and its scale. The calibration may be facilitated by reading the reference voltage with a high resolution digital voltmeter, in which case the control dial need not be directly calibrated. The fixed voltage reference imparts to my new control system the unique capability of setting predetermined rates to a high degree of repeatability before the machine motion is started. Uniformity of the rate is maintained to the degree that the servo loop stiffness can force the machine to match the derivative output to that of the reference standard voltage.

My rate control system enables one to start and stop the travel at any point in time, to change the rate at any point in time, whether the machine is operating or is at rest, and to effect reversal of travel while the machine is operating. The control mode may be programmed from external rate reference voltage sources, as derived from computer control, or feedback control derived from other processes dependent upon or, in turn, controlling the machine is some interrelationship. My rate control system enables the machine to be speeded up instantly in a rapid traverse mode without mechanical restraint of any kind, due to the attachment of the rate controller, and the rate control is not subject to overload from such high speeds of operation.

In the stress rate mode, my method of rate control is applicable to control the rate of change of the stress parameter (i.e., change of pressure). It functions to effect a constant rate of change without the need for externally generated variable voltage reference functions for comparison. My method causes the controlled machine to become its own precision ramp function generator, the linearity of which is completely dependent upon the servo loop gain and the linearity of the transducer employed. Overall system accuracies are readily achieve and are of the same order as that of the linearity of the transducer alone.

For the system arrangement described for the stress rate mode, *the dependent variable of stress is displacement* of the ram, and the *desired invarient is stress rate*. Since stress rate is the desired invarient, the control is arranged to cause the ram displacement to be such as to minimize the error determined by comparison of the first derivative of the output of the transducer with the output of the fixed voltage reference. The reference voltage is chosen to have a value which is calibrated to represent a given *rate* of stress change.

The comparison is made by a differential comparator which is one link in a closed loop feedback system used to position the ram; thus, the rate of stress change per unit of time is used to control the ram travel, which further causes the pressure exerted to be controlled in such a way as to reduce the error in rate to a vanishingly small value.

The reference voltage which sets the rate is a linear function. Therefore, the calibration can be accurately made on a linear scale (or read out directly with an appropriate scaling factor) on an instrument such as a digital voltmeter, to read the *rate* in pounds or other units of stress, per minute. This reading may be taken while the machine is at rest before starting the machine in motion, as well as when the operation is under way, thus enabling accurate presetting of a rate in advance.

The linearity of the resulting pressure ramp function is predictable, and the deviation from linearity may be expressed as:

$$\Delta e \pm (1/(A+1))\Delta g$$

where $\Delta e$ is the transducer departure from linearity,
$\Delta g$ is the open loop servo departure from linearity, and
A is the open loop gain of the servo amplifier.

If, A, the gain of the servo amplifier is high, the second term becomes vanishingly small in significance, and the overall rate change approximates that the first term, which depends only on the transducer characteristics.

My rate control system is applicable to both increasing or decreasing rates and to both compressional or tensional loads.

My rate control system is simple, is predictable in operation, and is invarient in calibration. It provides for a marked improvement in linearity of the controlled function as plotted with respect to time. My control system enables control of the function without limitations due to the travel of the controlled parameter throughout the mechanical freedom of the machine. It is not necessary to restrict the rate control to include only a small permissible portion of the machine overall travel.

My rate control system quickly recovers from transient effects caused by rapid traverse of the machine or high rates of pressure change due to sudden contact of the ram with the workpiece. My rate control is easily adaptable to computer programmed operation.

My new rate control system is capable of flexibility of control, such that a pressure curve may be arrested, reversed, or continued at will, all my manipulation of the reference control voltage; it is not subject to the restraints imposed by ramp comparison schemes, nor is it subject to the undue complexity such schemes require in order to make them more flexible.

In my new rate control system, the ram of a testing press can start from any arbitrary distance away from the work sample and yet my system is in complete control when the ram touches the work at high speed. The derivative control immediately senses the start of the high stress rate and promptly arrests the speed with essentially no overshoot. This makes possible an automatic rapid traverse without the danger of destroying the sample to be tested, even when as the ram platen approaches the work at maximal closure speeds.

The rate control system of this invention may be switched on and the machine started without regard for the initial position of the ram, or without regard to any change in the heights of successive workpieces. When the ram platen is not in contact with the work, the load cell transducer output signal remains at zero, regardless of the speed of travel of the ram; thus, the servo system calls for maximum displacement of the ram in search for derivative output of the load cell signal. If there is no such output, closure continues at maximum rate until initial contact with the workpiece, at which time the stress level starts to rise, and the differentiated load cell signal then provides an error signal which causes the immediate arrest of the rapid travel to a value which is in keeping with the rate of pressure increase called for by the reference control setting.

My rate control system may be used for control of many other parameters in addition to rates of stress or strain, as heretofor outlined, and in many other machine systems and environments other than testing presses. It may be used in connection with hydraulic pressure control, in applications requiring close control of liquid pressure changes, for liquid level control, heat control, light control, control of the ratios of two variables, applications with respect to digital to analog conversion and the converse, precise control of the rate of change of magnetic fields, control of modifiers in nuclear reactors, control of the rate of ascent or descent of aircraft or submersibles, and any other control of rate of a parameter that can be measured by electrical means, and the operation of which systems are capable of being included within a closed loop servo system.

FIG. 1 shows a testing press 10 that comprises a power-driven ram 11, which may be hydraulically or mechanically moved, in an appropriate mounting arrangement as part of a loading frame 12. The ram 11 is capable of being driven in either direction by means of power from a power source 13, which may be a hydraulic pump or a power source to drive a mechanical screw. The press 10 may also have customary ancillary apparatus such as electrical power connections, switching facilities, overload protection, and mechanical conveniences for supporting a specimen 14.

The press 10 is arranged in combination with a modulator 15, such as a hydraulic servo valve which is electrically operated, or an electrically operated variable transmission. The modulator 15 is responsive to an electrical signal applied to its terminals, so that the degree of control is proportional to the potential and polarity of that signal. A transducer 16, such as a strain gage load cell having an output voltage which is proportional to the stress level applied along the axis to which it is designed to be responsive to said stress, may be arranged to apply its output voltage in the proper polarity to a suitable scaling amplifier 17, such as a feedback amplifier having adjustable gain characteristics. The scaling amplifier 17 is capable of scaling the signal voltage from the transducer 16 to a desired full scale range that is in keeping with the range of stress levels to be controlled, whether greater or less than the available transducer voltage.

A differentiator 18, such as a capacitor feedback amplifier type, is arranged to accept the scaled signal from the scaling amplifier 17 and to extract therefrom the time derivative of that signal. This time derivative is a measure of the rate of change of the stress level signal originating from the transducer 16 as a result of the stress load applied. The output derivative signal is applied to one input terminal of a comparator 19, such as a differential operational amplifier. To the other input terminal of the comparator is applied a reference voltage obtained from a voltage reference 20. This reference is the rate-set for the system and when made adjustable, is the rate-set control for the system. The comparator 19 develops as its output, a voltage potential which is proportional to the difference between the signals applied to its input terminals. This difference signal is a measure of the rate error, and the difference signal, after being proportioned to an appropriate power level through such amplification as may be necessary by the comparator circuitry, is applied to the terminals of the electrical input of the modulator 15, with such choice of polarity of connection so as to cause the modulator 15 to apply power to the power-driven ram 11 in an amount and direction so as to effect a reduction of the rate error. All of the components are arranged in a closed loop servocontrol, self-correcting rate control system.

The testing press 10 has its power-driven ram 11 loading frame 12, power source 13, its customary ancillary apparatus (such as electrical power connections, switching facilities, overload protection), and mechanical conveniences for supporting the specimen 14, all as before.

The press 10 is arranged in combination with the modulator 15, such as a hydraulic servo valve which is electrically operated, and the modulator 15 is responsive to an electrical signal applied to its terminals so that the degree of control is proportional to the potential and polarity of a signal, applied thereto. A transducer 16, such as a linear potentiometric displacement transducer, has an output voltage proportional to the relative position of the ram within the ram's limits of travel. The transducer 16 is arranged to apply its output voltage as a signal in the proper polarity to a differentiator 18, such as a capacitor feedback type, arranged to accept the transducer signal and to extract therefrom the time derivative of said signal. The time derivative is a measure of the rate of change of the position of the power-driven ram 11. If desired, a scaling amplifier such as the amplifier 17 in FIG. 1, may be employed between the transducer 16 and the differentiator 18. The output derivative signal is applied to one input terminal of a comparator 19, which has applied to its other input terminal, a reference potential obtained from a voltage reference 20, the reference being the rate-set for the system, and when made adjustable is the rate-set control for the system.

The comparator 20 develops as its output, a voltage potential which is proportional to the difference between the input signals, which after being proportioned to an appropriate power level through such amplification as may be necessary by the comparator circuitry, is applied to the terminals of the electrical input of the modulator 15, with such choice of polarity of connection so as to cause the modulator to apply power to the power-driven ram 11 in an amount and direction so as to effect a reduction of the rate error. All these components are arranged in a closed loop servocontrol, self-correcting rate control systems.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a testing device for hard material, power means for operating the testing device having parameters such as the amount of force applied to the material and the velocity of the force applying means, at least one of said parameters being controllable, the power means being capable of applying forces greater than 1,000 lbs. to the material with movement of distances less than 1 mil from zero to full load, an electrical transducer responsive to the operation of the device for sensing the controllable parameter and providing an output voltage which varies in linear proportion to variations of the controllable parameter, electrical differentiating means for extracting the time derivative of the transducer output voltage which is applied to its input, an adjustable reference voltage source settable to an amplitude representative of a selected rate of change of the controllable parameter, means for comparing the output of the differentiating means and the reference voltage to obtain an error voltage of an amplitude and polarity representing the rate and direction of departure from the selected rate, and modulating means responsive to said error voltage for controlling the power applied to the testing device in an amount and a direction to correct the amount and direction of departure of the said controllable parameter from the selected rate.

2. The structure of claim 1 wherein the controllable parameter is the force applied to the material.

3. The structure of claim 2 wherein the transducer is a strain gage load cell providing a linear output voltage.

4. The structure of claim 3 wherein said reference voltage source is adjustable during operation of said device, so that operation of the ram can be arrested, reversed or continued at will by adjustment of said reference voltage source.

5. The structure of claim 3 including a ram for applying the force and operated by the power means to move forward and back throughout a range of positions, a supporting frame supporting said ram and capable of restraining said ram and for providing support for a sample specimen of material to be compressionably and extensionably tested in said device.

6. The structure of claim 1 wherein the controllable parameter is that rate of movement of the force-applying means.

7. The structure of claim 6 wherein the force-applying means is a movable ram and the transducer is of the linear displacement type and provides a linear output voltage of an amplitude which is a measure of the relative position of the ram.

8. The structure of claim 1 in which the modulating means is a servo valve capable of controlling the power means to operate the testing device in amounts and direction for effecting reduction in the rate error.

9. The structure of claim 1 having signal amplifier means connected to said transducer means and capable of a voltage gain and a voltage loss for scaling the output of said transducer means to a desired level of voltage amplitude, said signal amplifier means having its output connected to said differentiator means.

10. The structure of claim 1 wherein said means for modulating is a linear servo valve capable of applying power to the controlled device proportionally in an amount and in either direction so as to effect a reduction in the rate error.

* * * * *